Patented Sept. 25, 1945

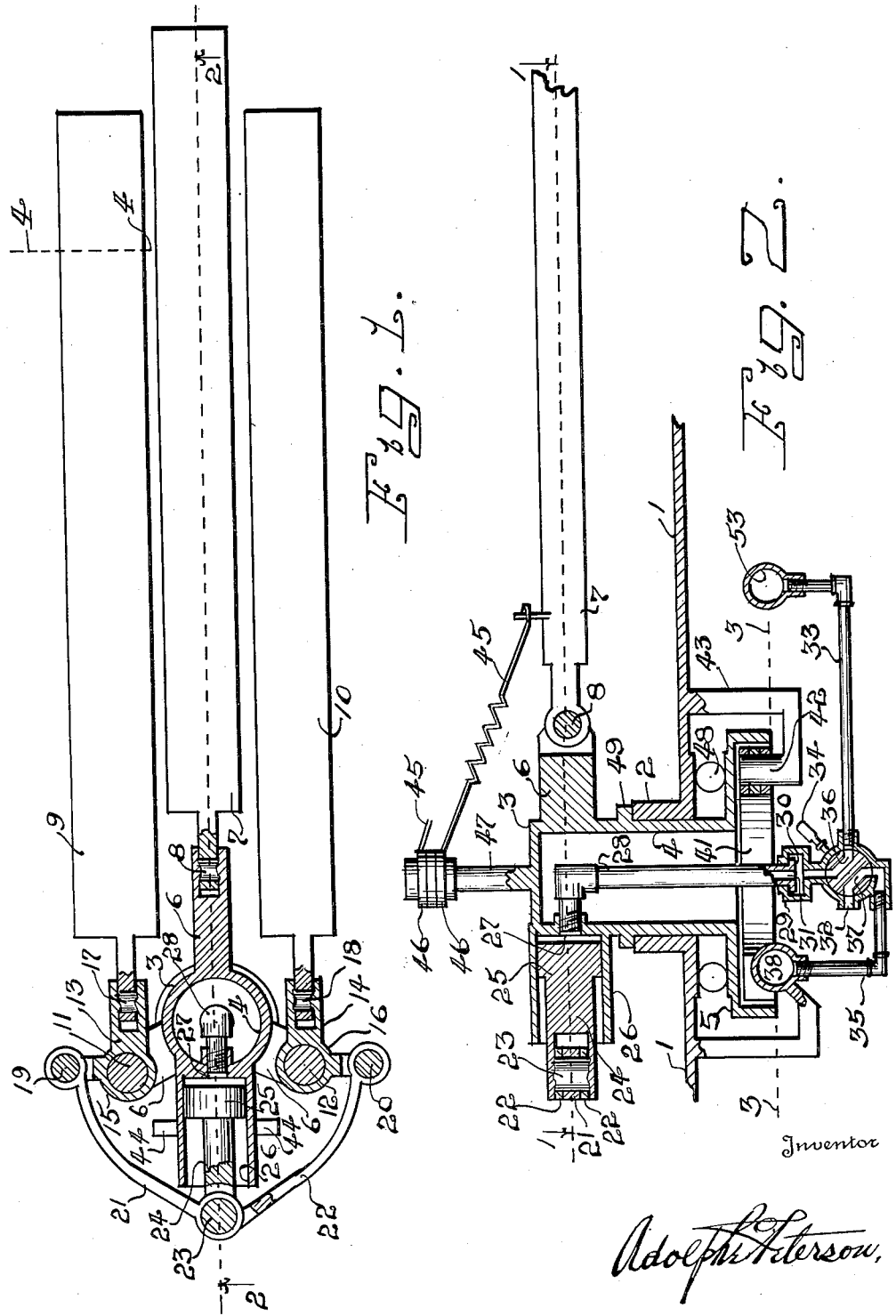

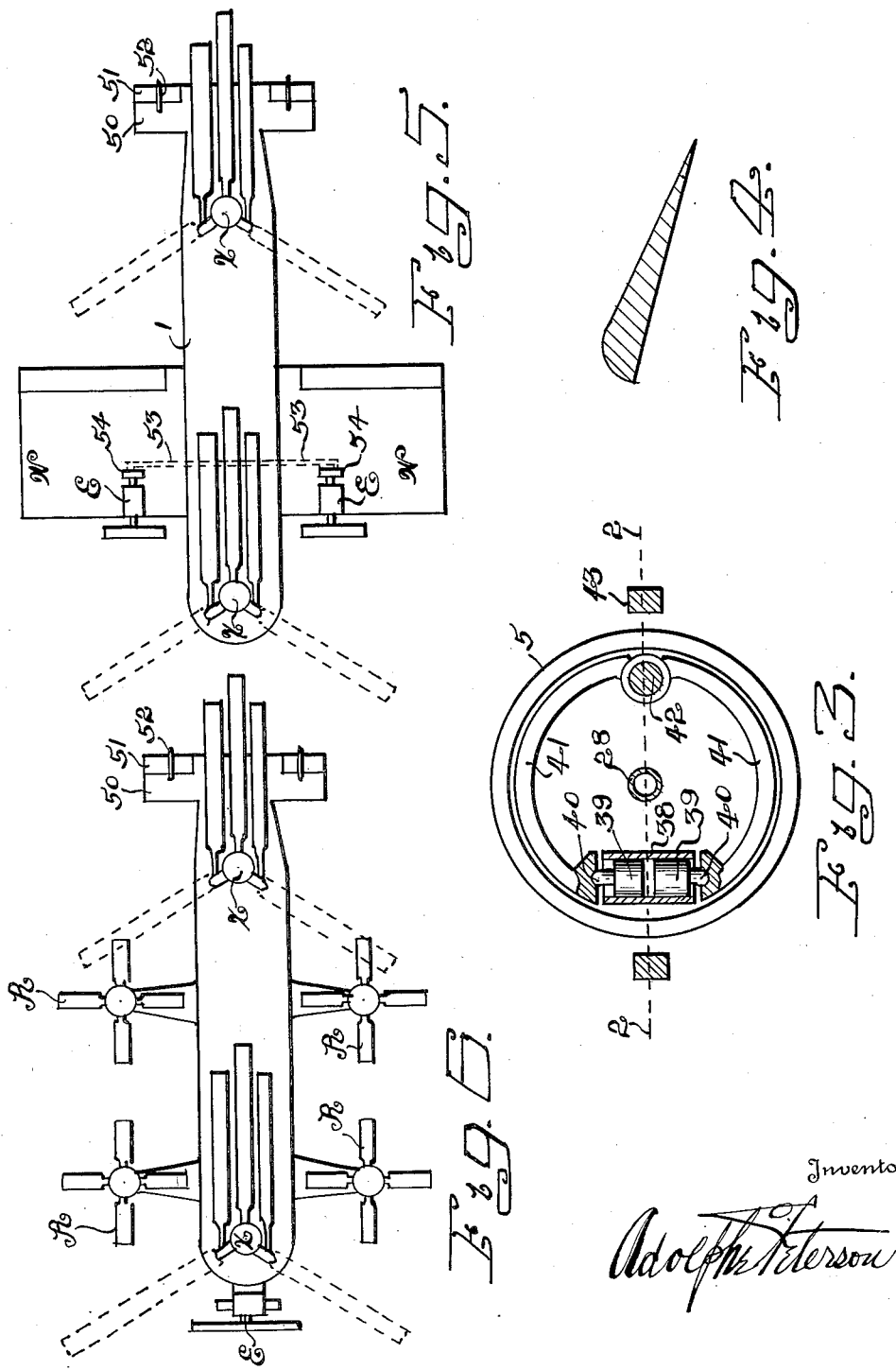

2,385,464

UNITED STATES PATENT OFFICE 2,385,464

AUXILIARY AUTOGIRO MEANS

Adolphe C. Peterson, Minneapolis, Minn.

Application March 20, 1941, Serial No. 384,356

12 Claims. (Cl. 170—160)

My invention relates to aeronautic means and particularly to a form of Autogiro means which is auxiliary or supplemental to other flight sustentation means wherefore it is called auxiliary Autogiro means.

The principal objects of my invention are to provide a form of auxiliary or supplemental flight sustentation means for aeronautic means or aircraft, which means may be effective for auxiliary sustentation when needed, and to provide this in a means which is simple and reliable in action, and which is not an additional impediment to normal flight except in an inconsequential or nominal degree. An object is to provide a supplemental flight sustentation means which means may be provided in aircraft to be at all times available to sustain the aircraft for slow descent to a landing in the event that the normal means of sustentation fails. An object is to provide a supplemental flight sustentation means which means may be provided in an aircraft as an auxiliary flight sustentation means for use in taking off and landing on ground or sea, so that the normal flight sustentation means such as wings may be of a lesser extent than such as commonly used and thereby enabling a faster normal speed with less power expenditure, while yet providing the sustentation means which may be necessary for the slow speeds necessary for landing either on sea or ground. An object is to provide such auxiliary means for such uses complemental to a normal flight sustentation means, in a form which is readily carried in aircraft, is quickly rendered active or inactive for such support, and which will not to any prohibitive extent impair the flight ability or speed of the aircraft in normal flight. An object is to provide such auxiliary sustentation means which may be available and adaptable for use either with some form of wing sustentation aircraft or some form of helicopter sustained aircraft. In particular an object is to provide such an auxiliary flight sustentation means for use with aircraft normally sustained in flight by rotating airfoil means such as helicopter apparatus, so that such means may be more readily and safely applicable to aircraft or any type of carrier means sustained in the air in travel. The last named application is a particularly desired and contemplated objective of this device, so that such rotatable sustentation means such as helicopter or other similar devices may be safely adopted, but that objective is not to exclude the use of this device in aircraft of the commonly used fixed wing type and with rotary propulsion means such as are commonly used and known.

The principal devices and combinations of devices comprising my invention are as hereafter described and as defined in the claims. In the accompanying drawings which illustrate my device and also illustrate the application to different forms of aircraft, like characters refer to like parts throughout the several views.

Referring to the drawings:

Figure 1 is a view chiefly in horizontal section on the line 1—1 of Figure 2, showing some parts in plan view.

Figure 2 is a view chiefly in vertical section on a plane passing through the axis of the principal operating parts, this sectional view showing a portion of the upper wall only of a fuselage to which the device is attached, and being a section on a line 2—2 of Figures 1 and 3.

Figure 3 is a detail in horizontal section on line 3—3 of Figure 2, showing in detail the braking means.

Figure 4 is a transverse section vertically through one of the air-foils or blades, and is on the line 4—4 of Figure 1.

Figure 5 is a plan view of the device as attached to one form of aircraft.

Figure 6 is a plan view of the device as attached to another form of aircraft.

Referring again to the drawings, the numeral 1 indicates the wall or body-wall of a fuselage or aircraft hull to which the device is attached, only a small segment of the upper part thereof being shown in Figure 1, showing the attachment of one device to the fuselage or hull.

In the fuselage body or hull 1 there is formed one or more bearings 2 in the upper side thereof, there being as many such bearings as there are auxiliary sustentation devices to be provided for the particular construction. Each bearing 2 is rather large and strong and is in the form of an upwardly extended cylindrical pillar as shown, so that there may be supported therein and rotatable therein as a bearing a cylindrical rotor unit 3.

Each auxiliary sustentation means has such unit 3 and is supported by a bearing 2, and there is now described the elements of this unit and the elements associated with it and forming with it an auxiliary flight rotor or Autogiro rotor unit. The rotor unit 3 consists mainly of the vertically disposed cylindrical and tubular part 4, a drum 5 formed integrally therewith and at the bottom thereof so that it by its upper side bears upwardly against the lower side of bearing 2, and at the upper end above hull 1, an attached or integrally formed or therewith welded set of laterally extending arms 6, three in number equi-distantly spaced around the axis of the unit, and each forming mounting for one air-foil, one of which 7 is directly mounted thereto by a horizontally disposed pivot pin 8, and the others of which denoted 9 and 10 are indirectly mounted thereon by means of vertically disposed pivot pins 11 and 12, two in number, and associated individually related horizontally oscillable bearing brackets or mountings 13 and 14, respectively.

The bearing brackets 13 and 14 each have the vertically disposed cylindrical bearing sleeve 15 and 16, respectively, by which it is oscillably mounted on the pivot pin 11 or 12, and each has near the axis of pin 11 or 12, secured or welded therein the horizontally disposed pivot pin 17 and 18 respectively by which the associated blade 9 or 10 is flexibly mounted so that it may swing in a vertical plane on the pin 17 or 18 as a bearing. The mounting of the bearing bracket 13 or 14 on its pivot pin 11 or 12 is such that the bearing bracket with its flexibly mounted or oscillably mounted blade 9 or 10 may swing through a sector which is approximately 120 degrees of the circle. The bearing brackets 13 and 14 have respectively formed integrally therewith or secured thereto a pivot bracket 19 or 20, and on these pivots are mounted as bearings the one end or near ends of the connecting links 21, 22, respectively, the opposite ends thereof being mounted by bearing parts as shown on one pivot pin 23 secured transversely of the outside end of rod 24 of pressure responsive piston 25. The latter is reciprocable horizontally in a short but rather large diameter cylinder 26 which is formed on one side of the upper end of the unit 3, integrally therewith, the cylinder being closed at its inner end nearest axis of the unit 3 but open except as closed by piston 25 at the outer or opposite end.

The cylinder 26 at its closed or inner end by port 27 and conduit 28 is connected for pressure fluid conduction with the interior of the bearing chamber 29, the latter being stationary, and the conduit 28 by its lower head end or flange 30 being revolvable within the chamber 29, so that the latter does not restrict that revolution but so that conduction of fluid to and from conduit 28 is permitted. The bearing chamber 29 by port 31 may be connected either with the pressure release port 32 or the fluid or air pressure conduit 33, this connection being determined by the hand valve 34, which may be turned to make either connection and at the same time make the opposite connections with a brake conduit 35 as hereinafter described. The hand valve 34 has the two ports 36 and 37, respectively, for making such connections alternatively, one of such ports being somewhat smaller than the other.

The brake conduit 35 delivers fluid pressure to or from brake control cylinder 38, the latter being stationary and having therein oppositely placed and reciprocable oppositely, pressure responsive pistons 39, there being two of such pistons 39, each by its rod 40 bearing against the opposite end of one brake shoe 41. The brake shoes 41 are thus so placed as to be oppositely forced outwardly by pistons 39, and they are pivotable on the pivot pin 42, the latter secured by bracket 43 to fuselage or hull 1. The brake shoes 41 are expansible within the cylindrical drum 5, so that on exertion of fluid pressure within cylinder 38 the pistons 39 move outwardly in opposite directions and force brake shoes 41 oppositely outward against the inner surface of the drum 5, thereby braking the latter and with it the unit 3 and its attached elements, against revolution, or slowing such revolution, so that the blades may take the positions hereinafter described. Conversely on release of pressure within the cylinder 38 brake shoes 41 are permitted to recede inwardly from the inner surface of drum 5 thereby releasing the drum 5 and unit 3.

The bearing brackets 13 and 14 with their blades attached are limited in their horizontally oscillating movement by blocks 44 on the sides of cylinder 26, so that when the blades are swung outwardly they will be held in the positions such that blades 9 and 10 are respectively, 120 degrees from blade 7 on its respective side thereof. The blades 7, 9, 10 have each a free swinging movement in a vertical plane relative to the mounting 3, but this movement is limited in the downward direction by the guy wires or cables 45 which each at one end is attached to its blade, and at the other is attached to a freely oscillating collar 46, of which there are three, and the collars 46 are freely oscillable on the post 47 fixed on the upper end of unit 3. The bearing balls 48 between the lower end of bearing 2 and drum 5 permit very free rotation of unit 3, when not braked, and also provide for upward thrust of drum 5 and unit 3 against the lower side of bearing 2, without friction. A collar 49 formed integrally with or secured to unit 3 fixes the unit 3 in relative position with bearing 2 by bearing downwardly against the upper end of bearing 2.

Having described in detail the elements composing one of the auxiliary means or units, reference is made to Figure 5 which shows the mounting of two of such units on an aircraft of the usual form, that is one having ordinary wings W and engine and propeller units E, for forward propulsion. Each auxiliary unit is generally designated by letter X. Referring to Figure 6 this figure shows the mounting of two auxiliary units such as I have described, on an aircraft such as the helicopter type, having horizontal rotors R for normal flight suspension in air, each unit R having its associated engine for driving thereof. Engine and propellor units E may provide forward propulsion. Either type of aircraft may have tail wings 50 with elevators 51 and rudders 52 thereon, the latter having such control means as is usually used therewith, but such control means being not specifically shown since they are common to aircraft and are not a novel feature.

With either type of aircraft the auxiliary units are operated and controlled in the same manner, and either type has delivery of air or fluid under pressure to conduit 33 from a main air pressure conduit 53, which receives air under high pressure from any one of a multiple number of air compressors or units 54 mounted to be driven each by one of the engine units E (or R in the case of the second aircraft type). Thus each compressor unit 54 will deliver at any time air under pressure to main conduit 53 by way of check valved ports delivering thereto from the compressor unit, as is customary with such units, and thus air may be delivered to conduit 53 by any compressor unit driven by any engine unit, of which it is contemplated that there will be a multiple number, at least two, and preferably more than two so that the air delivery will be more assured. Each unit 54 will have such means as is common to air compressors for restricting the delivery when the air pressure has reached a maximum pressure predetermined, whatever that pressure may be.

Such pressure should be as high as necessary to attain the control hereafter described whether that pressure be one hundred pounds or one thousand pounds. Any supplemental air pressure supply means may be also provided if desired.

The auxiliary units by the control means provided may be placed either in a contracted or an expanded position, the expanded or active positions of blades being procured by the air pressure means, and the contracted positions being procured by the air movement in flight or manually if desired when alighted, or otherwise. Preferably always before taking off, the auxiliary units are placed in the expanded condition, that is with blades swung into the 120 degree positions. In Figures 5 and 6, the expanded or 120 degree positions are shown by the dotted lines representing the blades which are pivotable. In Figures 5 and 6 the full lines of the blades show such blades in their receded or inactive positions.

For taking off, the pilot having started his engines so that air is being compressed into conduit 53, turns each hand valve 34 to connect the individual conduit 33 with the conduit 28 and cylinder 26 associated and thereby air under pressure passes to cylinder 26 and forces outwardly the piston 25 which thus by links 21, 22 draws brackets 19, 20 to swing bearing brackets 13, 14 with their blades 9—10 into the 120 degree position or active, expanded positions, relative to blade 7 of the unit, so that thus blades 7, 9, 10 take a position such that they are equi-distantly placed 120 degrees apart, and are thus in the position of Autogiro blades of the customary type, and will perform such as Autogiro blades, do, particularly known as blades of the Cierva Autogiro type.

In the control movement of valve 34 so connecting conduit 33 to conduit 28 and cylinder 26, the conduit 33 is disconnected from cylinder 38 of the brake means, and the latter is connected to the release port 32 so that air pressure is released from cylinder 38 and therefore pistons 39 may recede and permit brake shoes 41 to recede from drum 5 and release the unit 3, so that the latter may revolve. The auxiliary units are now in condition for the take-off and the pilot may now in the customary manner give such increased propulsion and motor effect to the propellors or rotors, that the aircraft may take off.

After taking off and when the aircraft is in normal flight at a high altitude, the pilot may permit the blades 9 and 10 of each unit 3, that is each auxiliary Autogiro unit, to recede into the inactive positions, by turning hand valve 34 to the opposite control position such that conduit 33 is disconnected from conduit 28 and cylinder 26 and connected with brake cylinder 38, the conduit 28 being thus at the same time connected with release port 32 so that air discharges from cylinder 26 as air enters cylinder 38. Thus simultaneously the air pressure is released from cylinder 26 and delivered to cylinder 38 of each auxiliary unit, which has its hand valve 34 so turned, and thus the unit 3 is braked by drum 5 and shoes 41, and the unit 3 with blades 7, 9, 10 slowed in revolution or stopped but the braking effect is not great enough to prevent the pressure of air against blades 9 and 10 in flight from thrusting those blades back into the receded positions as shown in Figures 5 and 6 by the full lines. This recession of the blades 9—10 is automatically accomplished by the air pressure against them in forward movement of the aircraft in flight, when the unit 3 is braked against revolution, although not so hard braked as to prevent the unit from taking the position with blade 7 rearwardly extended. The port 37 for release of air in valve 34 is smaller than port 36 so that the air release is somewhat slower. The reverse effect may be adopted if preferred or found more suitable so that air releases faster than it is introduced. The air pressure and the size of the cylinder 38 must be so proportioned that while revolution of the unit 3 is effectively slowed and approximately stopped, there may be enough slow movement of unit 3 to permit it to take the position where blade 7 is extended rearwardly, and blades 9, 10 receded to positions parallel to blade 7 in that receded condition. If found necessary or desirable the hand control by valve means of the conduits may be separated so as to permit of independent control of each function, braking and blade movement but preferably the simultaneous control is utilized to permit more certain control as indicated.

In flight when the blades 7, 9, 10 of an auxiliary unit are receded into the inactive positions, the blades 7, 9, 10 will trail back of the axis of unit 3 so that they will occupy the rearmost positions and thus interpose the least resistance against forward flight of the aircraft and thus they will then permit the most efficient forward flight of the aircraft at highest attainable speed. At anytime the unit is available for its auxiliary sustentation effect, and the pilot may at anytime secure this additional sustentation by turning the hand valve again to the position permitting air to flow under pressure to cylinder 26 and to be released from cylinder 38. Thus whenever there is any emergency and whenever the pilot decides to land, and especially in foggy weather when visibility is at a minimum, he may cause the blades of each unit 3 to be expanded to the active 120 degree positions and the brake effect to be released, and thus the unit is placed in condition for the Autogiro effect by rotation of the unit 3 with its blades 7, 9, 10. This Autogiro effect is well known and especially as of the type known as the Cierva type and therefore it is not necessary to more particularly describe this Autogiro effect which will contribute the auxiliary sustentation to the aircraft.

In alighting of aircraft, either on the sea or on the land, the use of the auxiliary Autogiro units, of which there may be any number preferably two or three or more placed in line on an aircraft, will permit of slow descent and slow landing free from damage and injury to the aircraft or its occupants. The use of a multiple number of compressor units each driven by its engine unit associated will ensure at anytime air pressure supply. In the active positions, the air pressure supply together with the centrifugal effect will retain the blades in the expanded 120 degree positions for active effect, but any means desired for locking blades in that position may be used if desired but is not shown for the sake of simplicity in the drawings and better illustration of the essential novel elements of my device.

It should be noted especially that the Autogiro blades 7, 9, 10 of any of the Autogiro units X must be supported, in the manner shown, by members 2 and 4, particularly, at such a sufficient height above the fuselage body or hull, and wings or propellors of the aircraft, that there will be no interference with the rotation of the blades 7, 9, 10, as an Autogiro unit, when that is permitted by the control means above described.

I contemplate that other means of controlling the Autogiro blades or air-foils may be adopted, to procure the effect illustrated and described, but that that shown is a preferable means of securing the effect described. Each Autogiro unit may have any number of air-foils or blades, relatively movable as indicated. While I have shown particular devices and combinations of devices in the illustration of my invention, I contemplate that other detailed devices and combinations of devices may be used in the realization of my invention without departing from the spirit and contemplation thereof. I especially intend that my device may be used as an auxiliary sustentation means for any means for carrying passengers or freight such as is sustained in the air in its travel. And I particularly contemplate the use of my device, as auxiliary sustentation means, for either aircraft of the heavier than air type or of the lighter than air type, the specific applications illustrated being typical of the use and application to any type of aircraft.

What I claim is:

1. A sustentation rotor means for aircraft, comprising, a carrying unit pivotally supported on a bearing means to be rotative in a horizontal plane, a plural number of airfoil blades carried by said carrying unit for rotation as a unit therewith; pivoting means for each of said blades whereby said blades are placeable in spaced positions radially extending from said carrying unit in the plane transversely thereof or in positions substantially parallel and trailing from the said carrying unit, in said plane transversely thereof, and a fluid actuated torque interaction motor means borne on said carrying unit for reaction between said blades and said carrying unit to moves aid blades on their pivoting means in said plane transversely of said carrying unit.

2. A sustentation rotor means for aircraft, comprising, a rotor hub, a bearing means for mounting of said rotor hub for rotation on a vertical axis, a plural number of airfoil blades secured to said rotor hub for rotation as a unit therewith, each said blade being pivoted on a vertical axis on said hub whereby each said blade is pivotable on its vertical pivot axis for placing of said blades in spaced positions radially extending from said hub in the plane transversely thereof or in positions substantially parallel and trailing from said hub in said plane transversely thereof, and a motor means carried on said rotor hub for fluid pressure actuation to effect placing of said airfoil blades in their spaced radial positions about said rotor hub.

3. A sustentation rotor means for aircraft, comprising, a rotor hub, a bearing means for mounting of said rotor hub for rotation on a vertical axis, a plural number of airfoil blades secured to said rotor hub for rotation as a unit therewith each said blade being pivoted on a vertical axis on said hub whereby each said blade is pivotable on its vertical pivot axis for placing of said blades in spaced positions radially extending from said hub in the plane transversely thereof or in positions substantially parallel and trailing from said hub in said plane transversely thereof, and a motor means carried on said rotor hub for fluid pressure actuation to effect placing of said airfoil blades in their spaced radial positions about said rotor hub, and control means for said motor means to effect placing in said radial positions or permit placing in said trailing positions.

4. A sustentation rotor means for aircraft, comprising, a rotor hub, a bearing means for mounting of said rotor hub for rotation on a vertical axis, a plural number of airfoil blades secured to said rotor hub for rotation as a unit therewith each said blade being pivoted on a vertical axis on said hub whereby each said blade is pivotable on its vertical pivot axis for placing of said blades in spaced positions radially extending from said hub in the plane transversely thereof or in positions substantially parallel and trailing from said hub in said plane transversely thereof, a motor means formed on said rotor hub, said motor means including pressure responsive means connected with said blades for effecting movement of said blades in said plane transversely of said hub on their vertical axes.

5. A sustentation rotor means for aircraft, comprising, a rotor hub, a bearing means for mounting of said rotor hub to be rotative in a horizontal plane, a plural number of airfoil blades secured to said rotor hub for rotation as a unit therewith, each said blade having a vertical pivot on said hub whereby each said blade is pivotable on its vertical pivot axis for placing of said blades in spaced positions radially extending from said hub in the plane transversely thereof or in positions substantially parallel and trailing from said hub in said plane transversely thereof, a motor formed on said hub for actuation by a conduit carried agent, said motor having means interconnected with said air-foil blades to interpose torque between said rotor hub and said blades to effect movement of said blades in said plane transversely of said hub on their vertical axes, and means for delivering an operative agent to said motor for the actuation thereof.

6. A sustentation rotor means for aircraft, comprising, a rotor hub, a bearing means for mounting of said rotor hub to be rotative in a horizontal plane, a plural number of airfoil blades secured to said rotor hub for rotation as a unit therewith, each said blade having a vertical pivot on said hub whereby each said blade is pivotable on its vertical pivot axis for placing of said blades in spaced positions radially extending from said hub in the plane transversely thereof or in positions substantially parallel and trailing from said hub in said plane transversely thereof, a fluid pressure responsive means including a cylinder formed on said hub and piston means movable therein and interconnected with said blades for movement of said blades in said plane transversely of said hub on their vertical axes, and means for delivery of fluid under pressure to or from said cylinder for effectuation of movement of said blades in said plane transversely of said hub.

7. All means described in claim 6, and in combination a fluid supply means and fluid pressure responsive braking means for braking the rotation of said rotor hub, and control means for effecting fluid pressure supply to either the first named fluid pressure responsive means or the fluid pressure responsive braking means and simultaneous release of pressure from the other of said means.

8. A sustentation rotor means for aircraft, comprising, a rotor hub, a bearing means for mounting of said rotor hub to be rotative in a horizontal plane, a plural number of airfoil blades secured to said rotor hub for rotation as a unit therewith, each of said blades having a vertical pivot on said hub whereby each said blade is pivotable on its vertical pivot axis for placing of said blades in spaced positions radially extending from said hub in the plane transversely thereof or in positions substantially parallel and trailing from said hub in said plane transversely thereof, a motor means comprising a cylinder means formed on said hub and a pressure responsive piston means movable in said cylinder means and linkage interconnecting said piston means and said blades whereby said piston means under pressure of fluid in said cylinder means moves said blades on their vertical pivot axes in said plane transversely of said hub.

9. An Autogiro sustentation means for aircraft for rotation on a relatively vertically disposed bearing axis, comprising, a rotor hub, a plural number of airfoil blades each pivotably mounted on said rotor hub to swing in the horizontal plane of rotation of said means, a cylinder formed in said rotor hub and having interactuable therewith a piston, and means connecting said piston with said blades for movement of said blades in said plane of rotation whereby said blades may be placed in positions radially extending from said rotor hub or in parallel trailing positions, and means for delivering fluid under pressure to or from said cylinder for said actuation of said piston.

10. An Autogiro sustentation means for aircraft for rotation on a relatively vertically disposed axis, comprising, a rotor hub, a plural number of airfoil blades each pivotably mounted on said rotor hub to swing in the horizontal plane of rotation of said means, a fluid actuated motor means the interactuating elements of which are carried on said rotor hub for rotation therewith as a unit, one or more of said interactuating elements having connection with said blades for imparting of movement in said plane of rotation to said blades whereby said blades may be placed in positions radially extending from said rotor hub or in parallel trailing positions, and means for delivering fluid under pressure to or from said motor means.

11. A sustentation rotor means for aircraft, comprising, a rotor hub, a bearing means for mounting of said rotor hub to be rotative in a horizontal plane, a plural number of airfoil blades secured to said rotor hub for rotation as a unit therewith, each of said blades having a vertical pivot on said hub whereby each said blade is pivotable on its vertical pivot axis for placing of said blades in spaced positions radially extending from said hub in the plane transversely thereof or in positions substantially parallel and trailing from said hub in said plane transversely thereof, a cylinder formed in said rotor hub with its axis in said plane transversely of said rotor hub and radially extending from the axis of said hub, a reciprocable piston in said cylinder, link means flexibly connecting said piston with said blades, means for alternatively delivering fluid under pressure to said cylinder for movement of said piston radially outwardly from the axis of said hub to force said blades into the positions radially extending from said hub or releasing fluid from said cylinder to permit said blades to recede into the parallel trailing positions.

12. A sustentation rotor means for aircraft, comprising, a rotor hub, a bearing means for mounting of said rotor hub to be rotative in a horizontal plane, a plural number of airfoil blades secured to said rotor hub for rotation as a unit therewith, each of said blades having a vertical pivot on said hub whereby each said blade is pivotable on its vertical pivot axis for placing of said blades in spaced positions radially extending from said hub in the plane transversely thereof or in positions substantially parallel and trailing from said hub in said plane transversely thereof, a cylinder formed in said rotor hub with its axis in said plane transversely of said rotor hub and radially extending from the axis of said hub, a reciprocable piston in said cylinder, link means flexibly connecting said piston with said blades, means for alternatively delivering fluid under pressure to said cylinder for movement of said piston radially outwardly from the axis of said hub to force said blades into the positions radially extending from said hub or releasing fluid from said cylinder to permit said blades to recede into the parallel trailing positions, and an airfoil blade secured to said rotor hub to occupy a position in said plane transversely of said hub centrally of said trailing positions of said first named blades and to be relatively immovable in said transverse plane.

ADOLPHE C. PETERSON.